United States Patent [19]

Schnyder

[11] 4,381,464

[45] Apr. 26, 1983

[54] EXTENDED LIFE, MOISTURE RESISTANT ELECTRIC MOTOR

[75] Inventor: William J. Schnyder, St. Louis County, Mo.

[73] Assignee: Emerson Electric Co., St. Louis, Mo.

[21] Appl. No.: 273,579

[22] Filed: Jun. 15, 1981

Related U.S. Application Data

[62] Division of Ser. No. 59,589, Jul. 23, 1979, Pat. No. 4,291,455.

[51] Int. Cl.$^3$ .............................................. H02K 3/44
[52] U.S. Cl. ........................................ 310/45; 310/71
[58] Field of Search ...................... 310/43, 45, 71, 42; 336/205

[56] References Cited

U.S. PATENT DOCUMENTS

| | | | |
|---|---|---|---|
| 2,935,859 | 5/1960 | Marvin | 310/45 X |
| 3,512,902 | 5/1970 | Emmon et al. | 29/596 X |
| 3,821,846 | 7/1974 | Pleiss et al. | 29/596 |
| 3,908,267 | 9/1975 | Loyd et al. | 29/631 |
| 3,912,957 | 10/1975 | Reynolds | 310/71 |
| 4,113,518 | 9/1978 | Henderson | 29/598 X |

Primary Examiner—John Gonzales
Attorney, Agent, or Firm—Polster, Polster and Lucchesi

[57] ABSTRACT

An electric motor which has an extended service life in high moisture environments. The motor includes non-moisture absorbing (i.e., non-hygroscopic) electrical insulation applied to the magnet wires comprising the stator coils of the motor, non-moisture absorbing ground insulation, a double-cured protective insulation coating applied to the stator coils and to the electrical connections thereof, and a connector insulation cap which effectively seals moisture out of the stator coil electrical connections. A method of manufacturing such moisture resistant motors is also disclosed.

10 Claims, 13 Drawing Figures

FIG. 7a.
FORM COILS

FIG. 7b.
INSERT COILS

FIG. 7c.
MAKE LEAD-TO-WINDING JUNCTIONS AND INTALL INSULATORS.

FIG. 7d.
BLOCK AND LACE END TURNS.

FIG. 7e.
DIP

FIG. 7f.
BAKE

EXTENDED LIFE, MOISTURE RESISTANT ELECTRIC MOTOR

CROSS-REFERENCE TO A RELATED APPLICATION

This is a division of application Ser. No. 059,589, filed July 23, 1979, now U.S. Pat. No. 4,291,455.

BACKGROUND OF THE INVENTION

This invention relates to electric motors, and more particularly to fractional horsepower electric motors which are especially resistant to failures caused by moisture.

Fractional horsepower electric motors used in such applications as window air conditioning units, central air conditioning units, heat pumps, farm machines, swimming pool pumps, jet pumps and evaporative cooling units often operate in a high moisture environment. The source of the moisture can be rain, condensation, or even a water spray used to clean the motor. Generally, this moisture adversely affects the electrical insulation in the motor causing its dielectric strength and resistivity to degrade during prolonged exposure to moisture, to electrical stress, and to thermal cycling.

In particular, it has been noted that moisture is especially harmful to motor lead wire insulation, ground insulation, electrical connector insulation, electrical insulating varnish, and magnet wire insulation. Upon any of the above-noted insulation materials appreciably breaking down in a high moisture environment, the motor will, in many instances, develop an internal electrical short which will either cause the motor to fail to operate, to draw excessive current, or to pose an electrical shock hazard to personnel.

Of course, ventilated motors having open end shields or vents in their stator shells are particularly susceptible to attack by high humidity and by air borne liquid water droplets. In certain motor applications in high moisture environments, the use of totally enclosed motors are oftentimes specified in place of open ventilated motors because they have a superior service life. While totally enclosed motors do, in most instances, afford appreciably longer service life, totally enclosed motors are more expensive than ventilated motors of comparable output and, in certain high temperature environments, are difficult to cool. Of course, if totally enclosed motors are not adequately cooled, their efficiency will decrease appreciably.

There has been a long standing, industry-wide need for a conventional ventilated motor, which has a significantly increased service life in high humidity and in high moisture operating environments and which is not significantly more expensive than prior ventilated motors.

SUMMARY OF THE INVENTION

Among the several objects and features of the present invention may be noted the provision of an electric motor and method of manufacturing the motor which has a service life in high humidity and in high moisture environments of many times that of prior art motors of similar design and which is comparable in cost to prior art ventilated motors of comparable size and output;

the provision of such a ventilated motor made in accordance with the method of this invention which has a service life appreciably longer than comparable prior art totally enclosed motors operating in the same environment and which costs appreciably less than the prior art totally enclosed motors;

the provision of such a method which enables improved service life motors of this invention to be readily manufactured in conventional production facilities with little or no change in the labor or time required to manufacture the motor and which does not require any major capital investment; and the provision of such a motor in which the major components of the motor (i.e., the stator, the rotor, the shell, the end shields and the bearings) remain unchanged from prior art motors.

Briefly, the method of manufacturing an electric motor of the present invention will now be set forth. The motor typically has a stator assembly including a core made of a stack of laminations of suitable ferromagnetic material with each lamination having a central opening therethrough and a plurality of notches extending generally radially outwardly from the bore, the central openings and notches respectively constituting the bore and the slots of the stator which extend longitudinally through the stator core. The motor further includes a plurality of coils of magnet wire are adapted to be inserted in the slots thereby to constitute the windings of the motor. These windings are adapted to be electrically connected to one another and to electrical power leads for energization of the motor. The motor still further includes a rotor assembly having a rotor body adapted to be rotatably received within the bore of the stator assembly and a rotor shaft extending from the rotor body. The motor includes one or more supports for rotatably journalling the rotor assembly within the stator. Specifically, the method of this invention comprises forming coils of magnet wire with the latter having an electrical insulating coating thereon of a non-moisture absorbing synthetic resin material, the sides of the coils being referred to as legs. Prior to inserting the coils in the slots of the stator, a layer of sheet electrical insulating material is inserted in each of the stator winding slots, the sheet insulating material being of a suitable non-moisture absorbing synthetic resin. The legs of one or more coils of the magnet wire are inserted in each of the stator slots with the sheets of insulating material electrically insulating the coils of magnet wire from the core laminations at the sides and bottom of the coil receiving slots. After the coils have been inserted in their respective slots, wedges of non-moisture absorbing synthetic resin material are inserted into each of the slots so as to close the slot, and to protect and electrically insulate the coils therewithin. The windings of the stator assembly are then connected together in a predetermined electrical arrangement so as to constitute the poles of the motor by electrically connecting the magnet wires of specified coil windings and by placing a connection insulator over the junction of the connected magnet wires. A plurality of power leads is then connected to specified points on the stator windings by electrically connecting one or more magnet wires of the stator windings to the conductors of the power leads and by placing a connection insulator over the junction of the power leads and the magnet wires. Each of these above-described insulators has a heat-shrinkable outer shell or cover with a mastic-like inner surface which adheres the insulator to the junction prior to the insulator being heat shrunk in place on the junction. Upon heat-shrinking of the insulator, the mastic-like material flows around the junction thereby to substantially encapsulate or seal the junction within the mastic-like material so as to substantially preclude moisture from the connection. The end turns of the stator windings are then blocked and formed and the end turns are secured to one another substantially in their formed positions at one or more ends of the stator assembly utilizing securement means of non-moisture absorbent synthetic resin material. The stator assembly together with the stator windings therein is dipped in a liquid electrical insulation material so as to coat all portions of the stator assembly with the liquid insulation material. The stator assembly is then removed from the liquid electrical insulation material and baked at an elevated temperature for curing of the electrical insulation on the stator assembly and for heat shrinking the insulators in place on their respective junctions. Finally, the rotor assembly is inserted in the stator assembly and is rotatably secured in-place therewithin.

An electric motor of the present invention having superior service life in high moisture environments comprises a stator assembly, a rotor assembly, and means for rotatably mounting the rotor assembly within the stator assembly. The latter comprises a core made of a plurality of laminations of suitable ferro-magnetic sheet material arranged in a stack, each of the laminations having a central opening and a plurality of notches extending radially from the central opening with the latter forming the bore of the stator and with the notches forming a plurality of slots extending longitudinally through the core when the laminations are stacked on one another to form the core. Sheet insulation material of non-moisture absorbent synthetic resin material is inserted in each of the slots so as to electrically insulate the sides and bases of the slots. A plurality of coils of magnet wire are inserted in the slots so as to constitute the stator windings of the motor, the magnet wire having a coating of insulation material of a suitable non-moisture absorbent synthetic resin thereon. Wedges of suitable non-moisture absorbent synthetic resin material are inserted into the slots so as to hold the coils therein and to insulate the coils. The coils are electrically connected to one another in a predetermined manner with the magnet wires of the coils being selectively electrically connected to one another by corresponding junctions. Certain of the coils are electrically connected to power input leads with the magnet wires of these certain coils and the conductors of the power leads being connected at other corresponding junctions. Connection insulators are placed on these junctions so as to surround the junctions. The insulators have a heat-shrinkable outer cover or shell and a coating of mastic-like material on the inside of the cover. This mastic-like material adheres the insulators to their respective junctions prior to heat shrinking and flows around and at least partially surrounds their respective junctions thereby to seal the junctions against moisture upon heat-shrinking of the insulators. The stator assembly is insulated as a unit and has at least one coat of a cured insulation varnish or the like applied thereto.

Other objects and features of the invention will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figures 1, 2, 3:
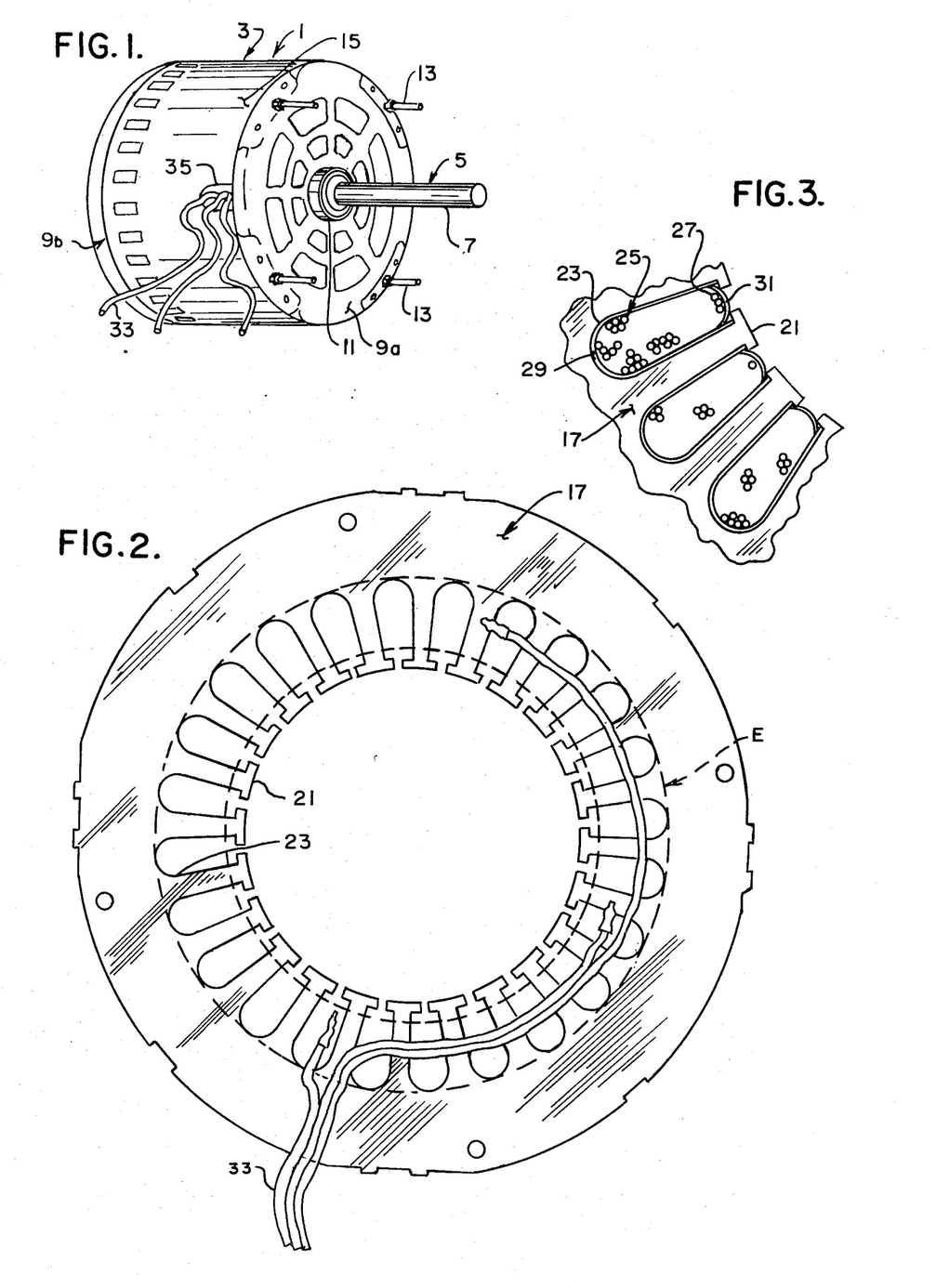
FIG. 1 is a perspective view of a typical fractional horsepower electric motor made in accordance with the method of the present invention.
FIG. 2 is an enlarged end view of the stator assembly of the motor of the present invention illustrating its core, its bore, its stator windings inserted in slots in the core, and power leads passing through its shell and electrically connected to the stator windings in accordance with this invention.
FIG. 3 is a cross sectional end view of typical stator slots showing respective coils inserted therein and further illustrating electrical insulators inserted in each of the slots and an insulator wedge for retaining and insulating the coils in their respective slots.

Referring now to the drawings, a moisture resistant, ventilated, fractional horsepower electric motor of this invention is indicated in its entirety by reference character 1 in FIG. 1. The motor is shown to have a stator assembly generally indicated at 3, a rotor assembly 5 having a rotor shaft 7 extending axially therefrom, a pair of end shields 9a, 9b secured to the stator assembly for journalling the rotor assembly, and bearings 11 carried by the end shields. The end shields are secured in-place on the stator assembly by means of stator through-bolts 13.

As best shown in FIG. 2, stator assembly 3 includes a cylindrical shell 15, a core 17 made of a stack of prepunched laminations made of a suitable sheet ferro-magnetic material. Each of the laminations has a central opening and a plurality of notches extending radially therefrom with the notches being generally equally spaced around the central opening. As mentioned above, the laminations are stacked so as to form a core 17 and, when so stacked, the central openings of the laminations form a stator bore 21 in the core for rotatably receiving the rotor body (not shown) of rotor assembly 5 and the notches form slots 23 extending longitudinally through the core for reception of coils 25 of magnet wire 27 which constitutes the stator windings of the motor. As shown in FIG. 2, end turns E of the stator windings are blocked and formed so as to be substantially in a generally circular arrangement (as viewed from the ends of the stator assembly). As is conventional, a plurality of windings or coils 25 is inserted in slots 23 so as to form a plurality of poles or windings for the motor. Each slot 25 may receive one or more coil legs and the poles may be so connected as to form one or more main sets of windings and an auxiliary winding for starting purposes. In FIG. 3, each slot is shown to have an insulator 29 of a suitable non-moisture absorbent synthetic resin, preferably such as sheet terephthalic polyester material commercially available from Dupont under the registered trademark Mylar. Coils 25 of magnet wire 27 are firmly held in place in their respective slots and within their respective insulators 29 and are insulated from the bore of the core by wedges 31 which are wedgingly inserted into the open ends of the slots after the coils have been placed in the slots. Wedges 31 are also of a suitable moisture resistant electrical insulation material, such as Mylar.

Figure 6:
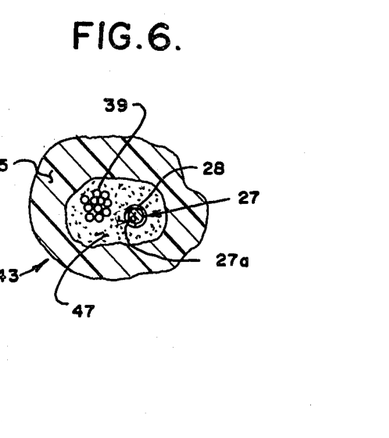
FIG. 6 is an enlarged cross-sectional view of the insulator taken along line 6—6 of FIG. 5 further illustrating how the mastic-like material surrounds the junction.

Magnet wire 27 includes a central conductor 27a of a suitable electrically conductive alloy, such as electric grade copper or the like. The conductor is insulated by one or more layers 28 (see FIG. 6) of moisture resistant synthetic resin insulation material. For example, the conductor may have a uniform coating 28 of a polyesteramidemide insulation material applied thereto, a preferred insulation material being commercially availale from Westinghouse under the registered trademark Omega. This preferred insulation material 28, when applied to conductor 27a, may have a thickness ranging between about 0.0007 and 0.0019 inches. Alternatively, other suitable moisture resistant magnet wire insulators may, within the broader aspects of this invention, be employed. For example, a two layer, moisture resistant insulation system may be used: a first layer of theic polyester-polyesterimide (or polyesteramidimide) applied to the conductor with an outer coating of polyamidimide. These above-described magnet wire insulation systems are commercially available and have heretofore been used in certain hermetic motor applications.

As shown in FIGS. 1 and 2, a plurality (e.g., three) of power leads 33 are fed into the motor through a pass-through opening 35 in shell 15 for energization of the main and auxiliary windings of the motor. In accordance with this invention, power leads 33 have moisture resistant electrical insulation 37 (see FIG. 4) such as a suitable neoprene rubber, PVC plastic, or other moisture resistant insulation material. Of course, insulation 37 overlies a lead wire conductor 39 (preferably a multistranded conductor).

Leads 33 are electrically connected to the magnet wires 27 of specified windings and the magnet wires of the various coils are electrically connected to one another at a plurality of junctions 41. At these junctions, a conductor 39 of a power lead 33 is electrically connected to a respective magnet wire 27 of a designated coil 25, or specified magnet wires of other of coils 25 are electrically connected to one another at other connections points as by soldering, brazing or by a mechanical connector (not shown) so as to provide a positive electrical interconnection therebetween.

Figure 4:
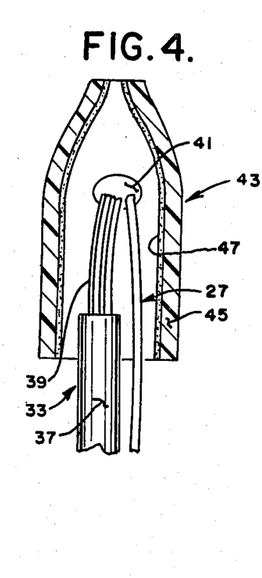
FIG. 4 is an enlarged cross sectional view of a heat-shrinkable connection insulator used in motors of the present invention for insulating lead-to-magnet wire connections and pole-to-pole connections, the insulators each having an outer heat-shrinkable shell or cover and an inner coating of mastic-like material, the insulator being illustrated in its condition prior to heat shrinking.
Figure 5:
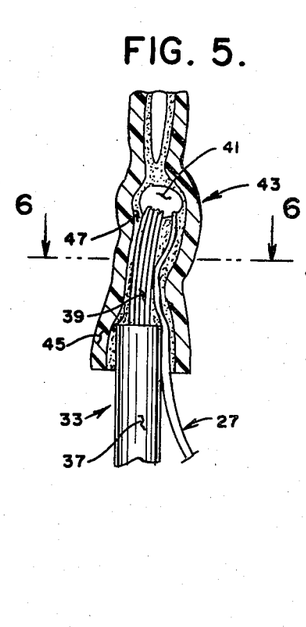
FIG. 5 is a view of the insulator as it is heat-shrunk onto its respective junction with the mastic-like coating on the inside of the shell at least partially surrounding the junction insulated thereby so as to effectively seal moisture from the junction.

In accordance with this invention, each junction 41 is electrically insulated and sealed against moisture by a respective heat-shrinkable connection insulator, as generally indicated at 43. The latter comprises an open-ended outer cover or shell 45 of a suitable low temperature, heat-shrinkable electrical insulative material, such as an irradiated, thoroughly cross-linked polyolefin. For example, shell 45 may have a minimum dielectric strength of about 500 volts per mil. Shell 45 is sufficiently large that the conductor 39 of a power lead 33 and magnet wire 27 to be insulated can be readily inserted therein prior to heat-shrinking of the shell. As shown in FIG. 4, the end of power lead 33 with conductor 39 exposed along with a portion of insulation 37 may be readily inserted into the open mouth of the shell together with magnet wire 27. Insulator 43 further includes a coating of a suitable mastic-like material 47, such as a polyolefin base modified with rubber and phenolic tackifiers, applied to the inner surface of shell 45. This mastic-like inner coating is tacky at room temperature so that it adheres to the conductors inserted therein prior to heat shrinking of the shell. Thus, insulators 43 may be placed on the junction 41 to be insulated and the insulator will stay in place during other manufacturing operations prior to heat shrinking. Further, mastic-like material 47 is applied to the inner surface of the shell in sufficient thickness such that upon heat-shrinking of the outer shell into tight overfitting relation with the conductors and junctions disposed therewithin, the mastic-like material is caused to flow within the shell thereby to at least partially surround the conductors therewithin so as to effectively seal any moisture from junction 41.

Since insulator 43 is adhesively secured to junction 41 and to the power lead 33 and magnet wire 27 prior to its being heat shrunk, and since shell 45 is preferably of a relatively low temperature heat shrink material, insulators 43 need not be heat shrunk in a separate heat shrink oven, but rather can be heat shrunk during the bake cycle of the electrical insulation varnish dip and bake procedure as will be hereinafter described. This not only eliminates one step in the manufacture of an electric motor and thus lowers the cost of manufacture, but it is also important that insulator 43 remains soft and pliable prior to its being heat shrunk so that upon lacing of the end turns E (as will be hereinafter described in detail), the soft and pliable nature of the insulator facilitates lacing of the end turns and lacing of the power leads in place on the end turns.

As mentioned above, after the end turns E have been blocked and formed, after power leads 33 have been properly electrically connected to the windings, and after all other winding connections have been made, the end turns at the lead end of the stator are laced or tied together and the power leads are secured to the end turns by lacing them in the conventional and well-known manner with a suitable lacing material 49 so as to hold the leads, connectors, and the end turns in a desired position at at least one end of the stator assembly. Also, the end turns of the other end of the stator may optionally be laced, if so desired. In accordance with this invention, lacing 49 is preferably of a moisture resistant synthetic electrical insulator material, such as a polyester textile fiber lacing material, and more specifically such as a Dacron polyester textile lacing commercially available from Dupont. By specifying that lacing 49 be of a non-moisture absorbent (i.e., non-hygroscopic) textile fiber lacing material, the latter will not attract and hold moisture in direct contact with electrical insulation on magnet wire 27 and thus enhances the moisture resistance of the motor of the present invention.

Figure 7A:
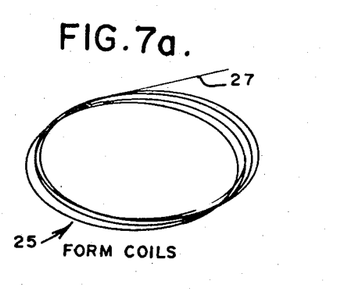
FIGS. 7a–7f illustrate in diagramatic form the steps of the method of this invention for the manufacture of a moisture resistant motor of the present invention.
Figure 7B:
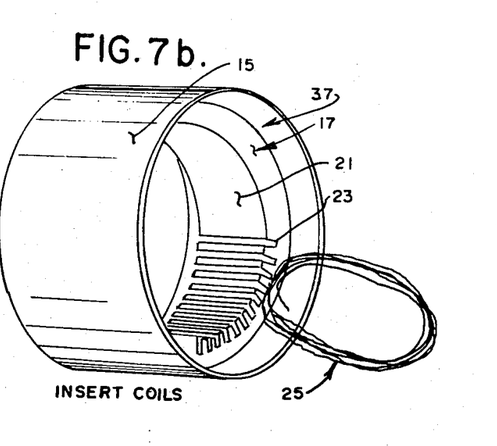

Referring now to FIG. 7a–7f, the method of this invention for the manufacturer of a moisture resistant motor 1 is diagramatically depicted. In describing the method of this invention, it will be understood that stator assembly 3 (i.e., core 17 and shell 15), rotor assembly 5, and end shields 9a, 9b are manufactured in the conventional and well-known manner. In FIG. 7a, a coil 25 of magnet wire 27 electrically insulated with coating 28 of water resistant electrically insulation material, as described, is wound or otherwise formed for insertion into slots 23 of core 17. In FIG. 7b, the opposite sides or legs of coils 25 are shown to be placed in designated slots 23 of the core with the slots having previously been insulated by placing insulators 29 therein. After the legs of coils 25 have been placed in their designated slots, insulator wedges 31 are inserted in the open ends of the slots to insulate the coils from the bore 21 of the core. It will of course be understood that the winding, placement, and wedging of coils 25 may be accomplished by suitable automatic winder, placer, wedger machines well-known in the motor manufacturing art. It will also be appreciated that insulators 29 of the above-described moisture resistant, non-hygroscopic insulation material can be automatically fabricated from bulk roll stock and can be automatically inserted in slots 23 prior to insertion of coils 25 by well-known slot cell insulator inserting machines in the conventional manner.

Figure 7C:
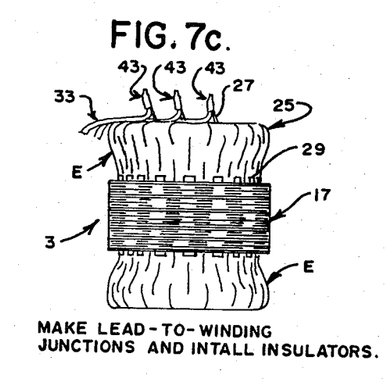
Figure 7D:
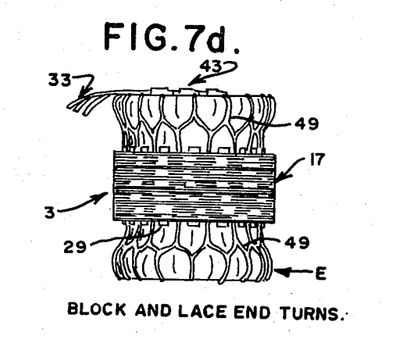
Figure 7E:
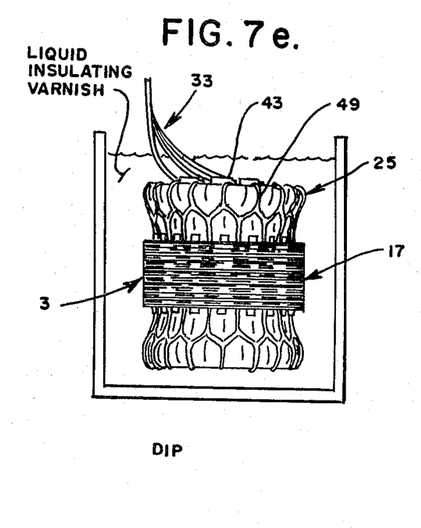
Figure 7F:
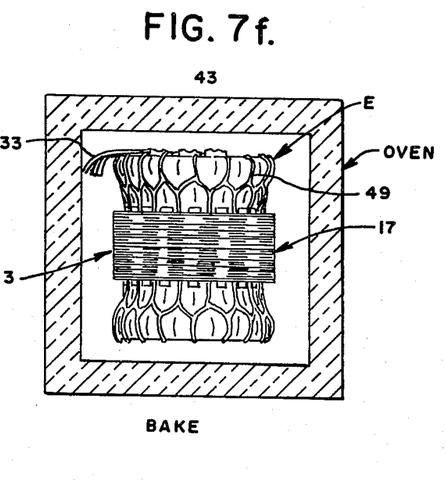

As depicted in FIG. 7c, power leads 33 are then electrically connected to designated coil wires 27 of specified coils 25 and the predetermined coils of the stator assembly may (if necessary) be electrically connected to one another so as to constitute the pole-to-pole electrical connections of the motor. Electrical junctions 41 are made by soldering, brazing, or by securing a suitable mechanical connector (not shown) on the conductors to be electrically connected. Insulators 43 are then placed over the junctions.

End turns E are then blocked and formed into a desired shape and then are laced or tied by lacing material 49 (see FIG. 7d) or by any other suitable non-hygroscopic lacing material in the well-known manner. As is conventional, lacing 49 not only serves to hold end turns E in position, but also serves to tie power leads 33 to the end turns and to hold the pole-to-pole electrical connections of the coils on the end turns thereby to provide strain relief for the power leads and to prevent vibration of the connections during preparation of the motor. It will be understood that in accordance with this invention it may not be necessary to lace the end turns at both ends of stator assembly 3. Because insulators 43 are not yet shrunk onto junctions 41, the insulators remain bendable permitting the lacing operation to be more easily and quickly carried out. Also, it will be appreciated that mastic coating 47 within insulators 43 adhesively holds the insulators on their respective junctions until such time as they are heat shrunk in place.

After lacing, stator assemblies 3 are loaded onto a rack or other suitable fixture and are dipped (i.e., totally immersed) in a liquid electrical insulating varnish (FIG. 7e) to cover all portions of the stator assembly and to penetrate all portions of coils 25 inserted therewithin. It will be understood that this liquid varnish also flows into all insulators 43 to coat conductors 39 of power leads 33 and junctions 41. Because insulators 43 have not yet been heat shrunk, the liquid varnish may readily flow into the interior thereof. Preferably, the insulating varnish is a conventional, commercially available varnish having between about 28 and 32% solids with the insulator solids being maintained in solution by suitable and well-known solvent, such as xylol or xylene, which is driven off at elevated temperatures during a subsequent curing or baking cycle. It will be understood that any one of a number of known varnishes may be used and approximately the same results will be attained. It is preferred that the stator be immersed in the varnish for twenty seconds or more to insure that the varnish penetrates all portions of the stator.

As noted, after dipping of the stator assemblies in the liquid insulation varnish, the stator assemblies are moved from the varnish bath are placed in elevated temperature environment, such as in an oven (see FIG. 7f) which is preferably maintained at a temperature ranging between about 200 and 375 degrees Fahrenheit and even more preferably about 220 and 260 degrees. It will be understood, however, that other temperature ranges may be used for other varnishes. The stator assemblies are maintained in the oven for a time sufficient to adequately cure the insulation material. This cure time will vary according to the size and mass of the stator assembly and according to the curing characteristics of the varnish being used. For example, certain stator assemblies are cured for a minimum of about 55 minutes or until the core temperature (as measured at the center of the core in a slot) attains a temperature of at least 275 degrees F. and is maintained at this temperature for at least 15 minutes.

Even more preferably, motors 1 made in accordance with the method of this invention undergo a multiple (preferably a double) dipping and baking procedure in so as to provide a double electrical insulation coating on the stator assembly. In essense, the second dip and bake operation is as above-described. However, for certain motors it may be desirable that the stator assembly be oriented differently for the second dip and bake operation thereby to ensure a more uniform application of the insulating varnish on all parts of the stator assembly. For example, in the first dip and bake operation, stator assemblies 3 may be so oriented that their bores 21 are vertical and so that their power leads 33 are up (see FIG. 7e). On the second dip and bake operation, the stator may be turned 180 degrees top to bottom so that with the stator bore vertical, the power leads are down (not shown). Of course, other variations of the dip and bake procedure may be utilized.

As noted above in regard to electrical insulators 43, the insulators are not heat shrunk on their respective junctions 41 in a separate heat shrinking cycle, but are heat shrunk contemporaneously with the first bake cycle of the varnish insulation coating procedure. Thus the baking cycle has two functions, that is, to cure the electrical insulating varnish and to heat shrink connectors 43. This not only simplifies the motor manufacturing procedure, but also results in a considerable cost reduction. Also, with connectors 43 in their "unshrunk" state, the liquid varnish will readily flow into the connector upon the stator being dipped in the varnish solution. This has the effect of sealing the connection within the varnish and offers further resistance to moisture caused impairment of motor operation.

Still further in accordance with the method of this invention for manufacturing moisture resistant motors, rotor assembly 5 may optionally be treated so as to inhibit the formation of corrosion (e.g., rust) thereon, particularly on the outer surfaces of the rotor body laminations. This step of protecting the rotor body is fully described in the co-assigned U.S. Pat. No. 4,113,518, the disclosure of which is herein incorporated by reference. In brief, the motor assembly may be coated with an oil retention solution, such as an aqueous metal phosphate (e.g., zinc phosphate). Then, the coated rotor surfaces are treated with oil.

The improvement of this invention results in a motor 1 which suprisingly, has a significantly greater service life than comparable motors in high moisture operating environments. Even more suprisingly, motor 1 of this invention can be manufactured at a cost comparable to prior art electric motors not enjoying its greater service life.

EXAMPLE

Figure 8:
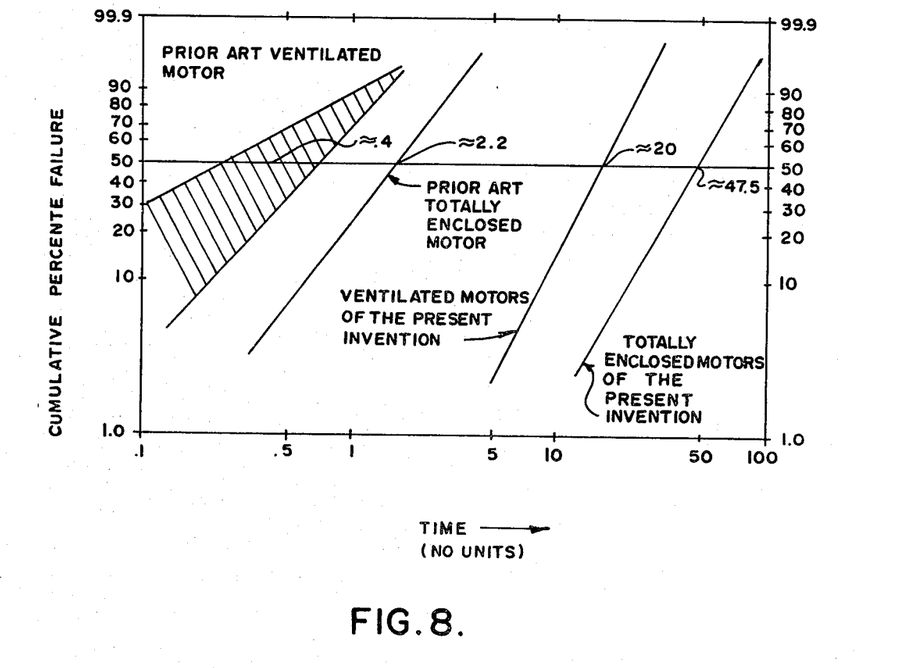
FIG. 8 is a graphical representation of the Wiebull probability distribution of the cummulative percent of failure versus the time to failure of various prior art motors and moisture resistant motors of the present invention in an accelerated rain chamber, high moisture environment test.

As shown in FIG. 8, accelerated service life test in a rain chamber were conducted with prior art ventilated 5.5 inch PSC motors, with comparable size totally enclosed prior art motors, and with 5.5 inch PSC ventilated motors of the present invention having improved ground insulators 29, improved insulating wedges 31, improved magnet wire insulation 28, heat-shrinkable insulators 43, and a double dip and bake varnish electrical insulation applied to the stator assembly. In each group of test motors, a number of the motors to be tested were installed in the rain chamber. Each motor was connected to a fan which operated within the rain chamber and a water spray was directed on the motors from above. Of course, the fan blew water droplets in virtually every direction with great force within the rain chamber and forceably drove the water droplets into all openings in the motor from all directions. The operating characteristics of the motor were continuously recorded and the total operating time of the motor until failure was recorded. Failure was determined by shorting out of the motor with a consequent failure of the motor to continue to operate or by excessive current draw.

As shown in FIG. 8, a range of prior art motor service lives is shown. The cummulative Wiebull distribution of the cumulative percentage of motor failures is plotted against a non-dimensional log time reference. For purposes of comparison, the average 50 percentile failure levels of the different motors are compared so as to establish relative service lives. The 50 percentile cummulative failure level service lives for the various motor test groups are as follows: prior art ventilated motors, about 0.4; prior art totally enclosed motors, about 2.2; for moisture resistant motors 1 of the present invention, about 20; and for totally enclosed motors made in accordance with the present invention, about 47.5. Thus, it can be readily seen that the service life of moisture resistant motors 1 of the present invention is markedly better than the service lives of comparable prior art ventilated motors. In fact, the best test results of ventilated motors of the present invention have suprisingly shown a 50% survival rate in the accelerated rain chamber high moisture environment test of approximately 50 times better (i.e., 20/0.4 times) than prior art ventilated motors.

While the above test data is not a one-time best result, other similar tests have resulted in considerable scatter in the data. Conservative engineering evaluations of the average test data of motors of this invention have shown a 50% survival life of about twenty (20) times prior art motors in rain chamber testing.

As also may be observed in FIG. 8, ventilated motors of this invention appear to have a 50% survival life in the rain chamber superior to prior art totally enclosed motors.

As shown in the drawings and as heretofore described, the motor 1 of this invention and the method of this invention relate to ventilated electrical motors. It will be understood, however, that this method of manufacturing moisture resistant motors can be applied to virtually any motor design. As shown in FIG. 8, a ventilated motor made in accordance with the method of this invention has a marked increase in service life over prior art totally enclosed motors. Also, similar test data has shown that totally enclosed motors made in accordance with the present invention have an even greater service life in accelerated rain chamber tests over ventilated motors 1 of the present invention.

In view of the above, it will be seen that the several objects and features of this invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

I claim:

1. An electric motor having a superior service life in high moisture environments, said motor comprising a stator assembly, a rotor assembly, and means for rotatably mounting said rotor assembly within said stator assembly, the latter comprising a core made of a plurality of laminations of suitable magnetic sheet-like material formed in a stack, each of said laminations having a central opening and a plurality of notches extending radially outwardly from said central opening with the latter forming a bore of said stator assembly and with said notches forming a plurality of slots extending longitudinally through said core when said laminations are stacked to form said core, sheet insulation material of non-water absorbing synthetic resin material inserted in each of said slots so as to electrically insulate the sides and bases of said slots, a plurality of coils of magnet wire, the latter having a coating of electrical insulation material thereon of suitable non-moisture absorbent synthetic resin material, said coils being inserted in said slots so as to constitute the stator windings of the motor, wedges of suitable non-moisture absorbent synthetic resin material insertable into said slots so as to hold said coils therein and to insulate said coils, said coils being electrically connected to one another in a predetermined manner so as to form the poles of the motor, certain of said coils being electrically connected to power leads with the connections of the magnet wires of these certain coils and the conductors of said power leads also being referred to as junctions, an electrical connection insulator being installed on each of said junctions, said connection insulators each having a heat shrinkable outer cover and a coating of mastic-like material on the inside thereof, said coating adhereing said connection insulators to their respective junctions prior to heat shrinking, said connection insulators being of larger internal cross section than the diameter of said power lead and magnet wire constituting a junction so as to permit said connection insulators to be readily installed on said junctions and to permit liquid electrical insulation to flow into said connection insulators and around said junctions upon dipping of the stator assembly into said liquid electrical insulation, said coating being flowable around said junctions upon heat shrinking of the cover thereby to seal said junctions against moisture, said stator assembly being insulated as a unit and having at least one coat of the cured liquid insulation, whereby, upon curing, excess liquid electrical insulation is forced out of said connection insulators and said mastic-like coating effectively seals moisture from said junctions.

2. An electric motor as set forth in claim 1 wherein said insulation coating for said magnet wire is a polyesteramidimide.

3. An electric motor as set forth in claim 1 wherein said insulation coating for said magnet wire comprising a first layer of theic polyester resin applied to the conductor of said magnet wire and an outer coating of polyamidimide.

4. An electric motor as set forth in claim 1 wherein said insulation coating for said magnet wire comprises an inner layer of polyesteramidimide and an outer coating of polyamidimide.

5. An electric motor as set forth in claim 1 wherein said polyesteramidimide coating has a thickness ranging between about 0.0007 and 0.0019 inches.

6. An electric motor as set forth in claim 1 wherein said cover of said insulator is a crossed-linked, irradiated, polyolefin having a relatively low heat-shrink temperature.

7. An electric motor as set forth in claim 1 further including means at one end of said windings for securing said windings to one another, said securing means being of a non-moisture absorbent synthetic resin material.

8. An electric motor as set forth in claim 7 wherein said end turn securing means comprises one or more laces tied to said end turns, said lacing being of a non-moisture absorbent synthetic resin material.

9. An electric motor as set forth in claim 8 wherein said lacing is a polyester textile fiber lacing.

10. An electric motor as set forth in claim 1 wherein said stator assembly is insulated by two coats of baked-on insulation varnish.

* * * * *

UNITED STATES PATENT AND TRADEMARK OFFICE
CERTIFICATE OF CORRECTION

PATENT NO. : 4,381,464
DATED : April 26, 1983
INVENTOR(S) : William J. Schnyder

It is certified that error appears in the above-identified patent and that said Letters Patent are hereby corrected as shown below:

Claim 1, col. 11, lines 1 and 2, after "insulation" insert --- thereon,---.

Signed and Sealed this

Sixth Day of September 1983

[SEAL]

Attest:

GERALD J. MOSSINGHOFF

Attesting Officer

Commissioner of Patents and Trademarks